United States Patent [19]

Erickson et al.

[11] Patent Number: 5,401,833
[45] Date of Patent: Mar. 28, 1995

[54] METHOD AND APPARATUS FOR TREATING CHROME LEATHER WASTE

[75] Inventors: Paul R. Erickson, Glendale; Lloyd J. Uhren, Waukesha, both of Wis.; Jeffrey M. Waszgis, Omaha, Nebr.

[73] Assignee: United States Leather Holdings, Inc., Milwaukee, Wis.

[21] Appl. No.: 12,003

[22] Filed: Feb. 1, 1993

[51] Int. Cl.⁶ .......................... B01F 7/08; C07K 1/12; C07K 3/10; C25B 7/00
[52] U.S. Cl. .................... 530/407; 204/182.6; 422/184; 422/229; 422/233; 423/55; 530/343; 530/356
[58] Field of Search .............. 530/343, 355, 407, 356; 422/184, 229, 233; 69/21; 266/168, 170, 177; 423/55, 56; 204/182.6; 425/204

[56] References Cited

U.S. PATENT DOCUMENTS

| | | | |
|---|---|---|---|
| 3,051,640 | 8/1962 | Traxler | 204/182.6 |
| 3,159,703 | 12/1964 | Wolcott | 266/177 |
| 4,100,154 | 7/1978 | Holloway | 530/355 |
| 4,400,218 | 8/1983 | Koch et al. | 422/229 |
| 4,427,637 | 1/1984 | Iwashita et al. | 422/233 |
| 4,483,829 | 11/1984 | Guardini | 530/407 |
| 4,943,402 | 7/1990 | Kafka et al. | 425/209 |

FOREIGN PATENT DOCUMENTS

| | | | |
|---|---|---|---|
| 01910 | 6/1983 | WIPO | 422/229 |

OTHER PUBLICATIONS

Perry's Chemical Engineers' Handbook, 6th ed., McGraw-Hill Book Co., 1984, pp. 4-24,25,26.
"Utilization of Leather Waste—Animal Feedstuff From Chrome Shavings: Part 1, Pilot Plant Study", Dos Reis et al, Journal of the Society of Leather Technologies and Chemists, vol. 75, pp. 15-19.

*Primary Examiner*—Jeffrey E. Russel
*Attorney, Agent, or Firm*—Andrus, Sceales, Starke & Sawall

[57] ABSTRACT

An improved method and apparatus for treating chromium containing leather scrap to recover chromium compounds and to produce a protein hydrolysate. The leather scrap is fed into an upstream mixing zone of a reaction vessel along with an alkali metal solution and the scrap and the solution are mixed by a plurality of kneading paddles carried by a rotating shaft. The mixture is then passed to a downstream hydrolyzing zone and conveyed through the hydrolyzing zone by a spiral flight. The mixture is heated by the injection of steam to thereby produce a hydrolyzed mixture comprising a protein hydrolysate containing suspended, insoluble particles of chromium compound. The hydrolysate is separated from the precipitated chromium compounds and can be recirculated to the reaction vessel while the chromium compounds can be recovered for use in the tanning process. The concentrated hydrolysate can be subjected to electrophoresis to increase the concentration of any desired amino acid in the hydrolysate.

23 Claims, 3 Drawing Sheets

METHOD AND APPARATUS FOR TREATING CHROME LEATHER WASTE

BACKGROUND OF THE INVENTION

Chrome leather scrap or waste can consist of pieces or scraps that are trimmed from tanned hides and skins or fragmented when the tanned hide is split into one or two more layers, or can also consist of shavings or dust produced when the chrome tanned leather is machine shaved to a desired thickness.

The chrome leather scrap generally contains from about 75–80% by weight of protein, along with chromium oxide, inorganic salts and fats and oils.

Attempts have been made in the past to utilize chrome leather scrap or waste. For example, chrome leather scrap has been incinerated to produce energy, and has also been used in the past to produce adhesives or glues. In addition, chrome leather scrap has been used as a fertilizer and has also been approved in amounts less than 200 ppm of chromium for animal feed rations, but there has been little commercial interest in using the chrome leather scraps as a fertilizer or as an animal feed supplement because of the questionable effect of the chromium on animal and plant life. Thus the vast proportion of chrome leather scrap has been discarded, causing a serious environmental problem.

More recently, attempts have been made to hydrolyze the chrome leather scrap and recover the chromium compounds. In this regard, U.S. Pat. No. 4,100,154 describes a hydrolyzing process using an alkaline earth metal hydroxide, such as calcium oxide or hydroxide. In the process of that patent, the chrome leather scrap is mixed with a calcium oxide metal solution and heated to a temperature of about 200° F. to produce a hydrolysate which is subsequently filtered to separate the insoluble chromium compounds. The resulting filtrate is stated to have a chromium content of less than 5 ppm and the separated chromium compounds are indicated to be reusable in the tannery process.

Similarly, the article "*Utilization of Leather Waste—Animal Feedstuff from Chrome Shavings: Part 1, Pilot Plant Study*", Reis and Beleza, *Journal of the Society of Leather Technologists and Chemists*, Vol. 75, p. 15, describes an experimental process for removing chromium from chrome leather waste using calcium oxide. The article suggests that the hydrolysate, after separation of the precipitated chromium compounds, can be used as an animal feed supplement.

SUMMARY OF THE INVENTION

The invention is directed to an improved method and apparatus for treating chrome leather scrap or waste from tannery processes to produce a protein hydrolysate and to recover the chromium compounds for subsequent use in tanning processes.

In accordance with the invention, chrome leather waste containing approximately 50% moisture is fed in the form of an elongated plug by a piston-cylinder arrangement into the upstream end of a reactor vessel. The chrome leather waste is mixed with an alkali metal solution, preferably a potassium hydroxide solution, by a series of kneading paddles which are located in the upstream section of the reactor. The liquid mixture is progressively transferred to a downstream hydrolyzing zone of the reactor containing a spiral flight which slowly conveys the mixture toward the downstream end. While flowing through the hydrolyzing zone, the mixture is heated to a temperature of about 200° F. by introducing steam into the mixture to thereby produce a protein hydrolysate containing suspended, insoluble particles of chromium compounds.

The hydrolysate is continuously removed from the downstream end of the reaction vessel by overflowing a weir and is fed to a clarifier where the chromium compounds are separated from the hydrolysate by gravity separation. The underflow from the clarifier is conveyed sequentially to a gravity thickener and a vacuum filter to obtain a filter cake containing the chromium compounds which can subsequently be re-employed in the tanning process.

The overflow from the clarifier is split into two flow streams with one flow stream being recirculated to the upstream end of the reactor, while the second portion of the flow stream is conveyed to an evaporator where the hydrolysate is evaporated to obtain a solids content of at least 42%. The hydrolysate at this solids content can then be used as an animal feed supplement, fertilizer, or for the production of adhesives or other products.

As a feature of the invention, the concentrated hydrolysate from the evaporator can be subjected to electrophoresis to fractionate the amino acids in the hydrolysate and to increase the concentration of a desired amino acid. In this regard, the pH of the hydrolysate is adjusted to the iso-electric point of a desired amino acid and the hydrolysate is then passed through an electrophoresis cell which consists of a pair of spaced electrodes with a potential different of 5 to 10 volts per cm of electrode surface. A permeable membrane, preferably formed of fiber glass, is located inside each of the electrodes.

As the hydrolysate is passed through the cell, the desired amino acid having an isoelectric point corresponding to the pH will not be attracted to either of the electrodes and will pass through the center of the cell to be released at a rate related to its concentration in the feed stock. Amino acids which have low isoelectric points beneath the established pH will be attracted to the electrode with a high negative charge and will be released adjacent that electrode at a predetermined rate. Those amino acids with isoelectric points greater than the selected pH will be drawn to the opposite electrode and again released at a rate corresponding to the feed stock concentration. With this system, the concentration of the desired amino acid in the hydrolysate can be substantially increased. Also residual, organically bound chromium ions are pulled off on one of the side streams leaving the chromium ion concentration in the center stream as low as 0.69 mg/liter.

It is contemplated that the hydrolysis reaction can be carried out at ambient pressure or at a pressure of 0–15 psig. It is further contemplated that using pressurized reaction conditions, counter current airflow can be directed through the reactor to pick up volatiles released during the reaction and convey the volatiles to a suitable scrubber.

Through the use of the invention, the recovery of chromium is obtained without any undesirable side effects to the leather when the chromium is reused in the tanning process.

By recirculating a portion of the hydrolysate, the overall concentration of solids in the hydrolysate is increased and the amount of fresh water required for processing is reduced. Further, as the solids content of the solution fed to the evaporator is increased, the energy efficiency of the process is greatly increased because of the reduced volume of the hydrolysate to be evaporated.

The process of the invention enables the chrome leather waste to be treated on a continuous basis rather than a batch basis, in which the chrome waste is continuously fed to the reactor and the hydrolysate is continuously removed from the downstream end of the reactor.

Other objects and advantages will appear during the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
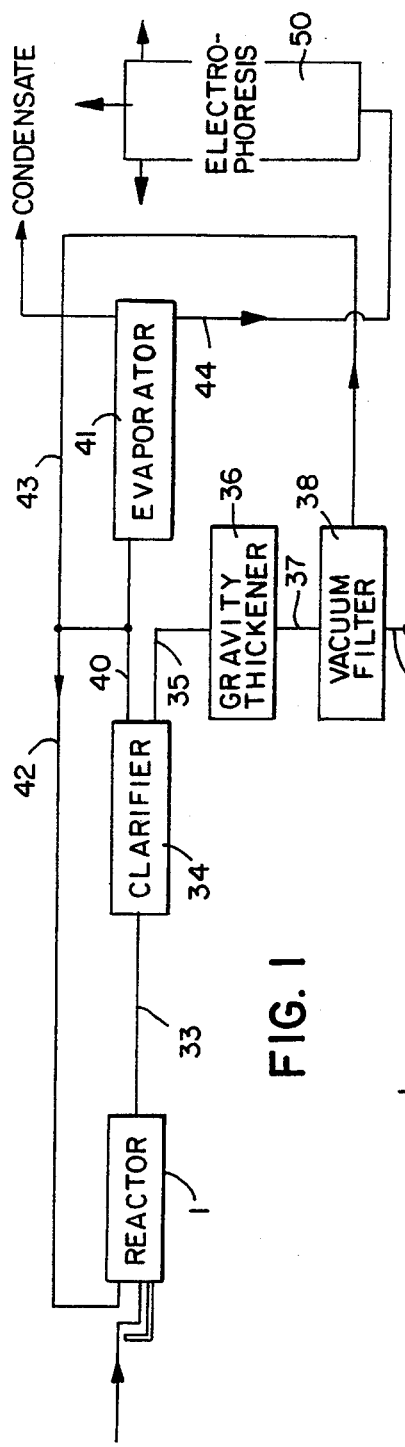
FIG. 1 is a schematic flow sheet showing the apparatus of the invention.

FIGS. 2-5 illustrate a reactor vessel 1 to be used for treating chrome leather scrap or waste from tannery processes to produce a protein hydrolysate and to recover the chromium compounds for subsequent use. The reactor vessel 1 is mounted on a supporting frame 2 and includes a pair of intersecting, partially cylindrical, open top sections 3. The upstream ends of the vessel sections 3 are enclosed by an upstream end wall 4, while the opposite ends of the sections are enclosed by a downstream end wall 5.

Reactor vessel 1 defines an upstream mixing zone 7, where the chrome leather scrap or waste is mixed with an alkali metal solution, and a downstream hydrolyzing zone 8 where the leather is hydrolyzed to produce a protein hydrolysate containing suspended insoluble particles of chromium compounds.

Mounted longitudinally within each vessel section 3 is a horizontal shaft 9, and shafts 9 are mounted for rotation in bearings 10, which are supported on the upper edges of walls 4 and 5.

Figure 2:
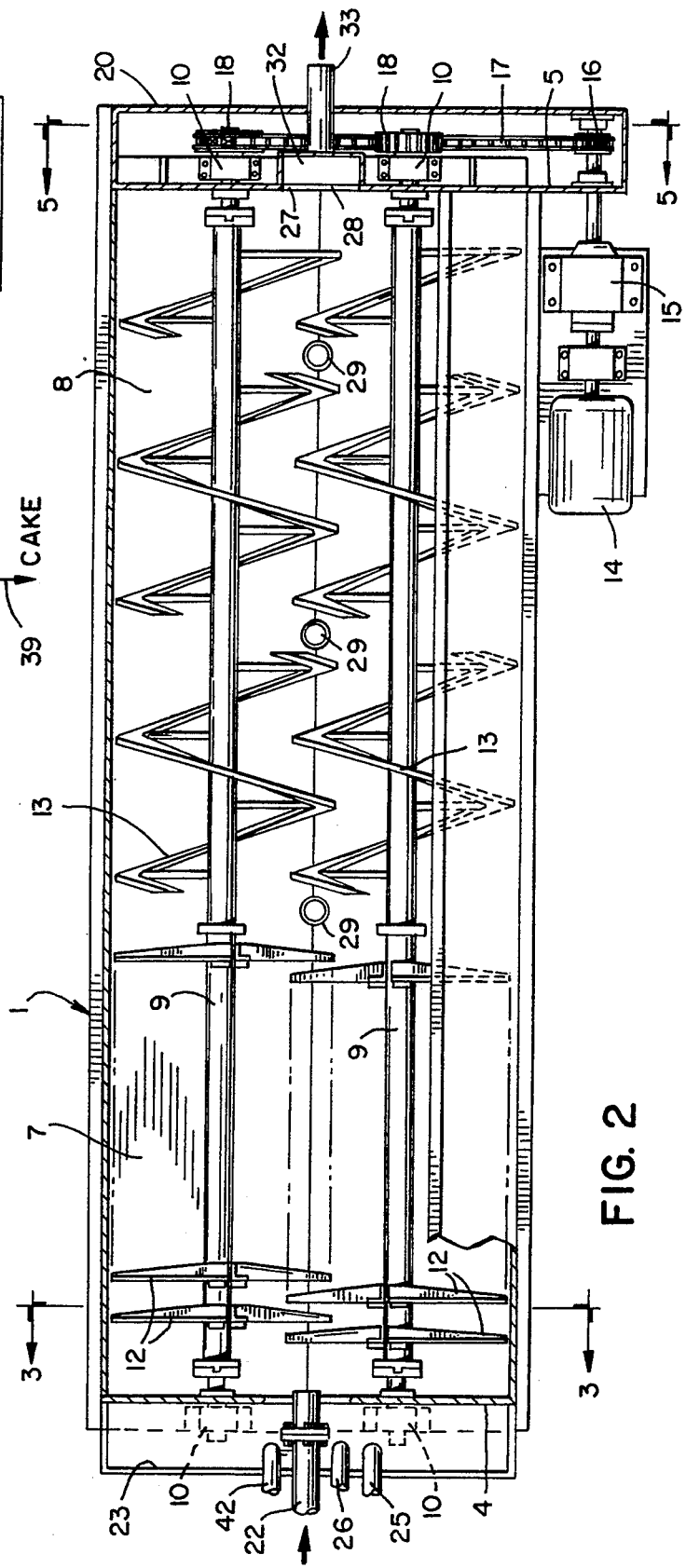
FIG. 2 is a top view with parts broken away in section of the reactor.

A plurality of kneading or mixing paddles 12 are mounted on the upstream end portion of each shaft 9 in mixing zone 7, and as best shown in FIG. 2, the paddles 12 on one shaft are interdigitated with the paddles on the other shaft. Rotation of the paddles 12 acts to thoroughly tumble and mix the leather scrap with the alkali metal solution in the mixing zone 7 of the vessel.

Mounted on the downstream end portion of each shaft is a helical ribbon flight 13. As in the case of the kneading paddles, the helical flights 13 on shafts 9 are interdigitated, as illustrated in FIG. 2. Rotation of helical flights 13 will serve to slowly tumble and convey the mixture in a downstream direction through the hydrolyzing zone 8.

Figure 5:
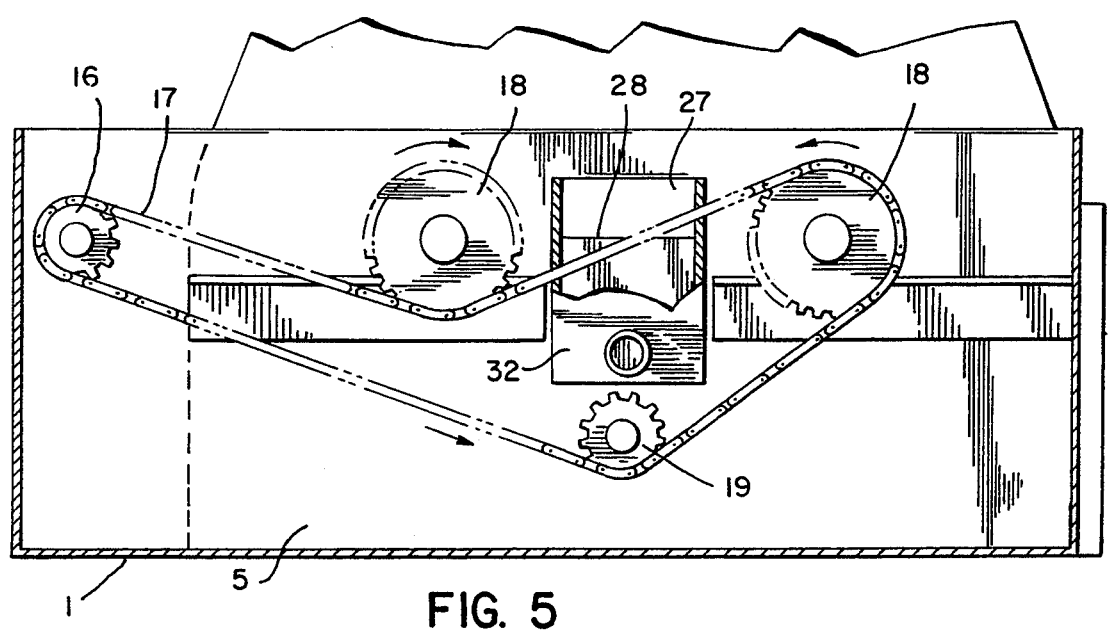
FIG. 5 is a downstream end view of the reactor taken along line 5—5 of FIG. 2.

Shafts 9 are rotated by a motor 14 which is mounted on frame 2. The drive shaft of motor 14 is coupled to a speed reducing transmission 15, and the output shaft of the transmission 15 carries a sprocket 16. Sprocket 16 is connected via a chain 17 to sprockets 18 mounted on the ends of shafts 9, as shown in FIG. 5. Chain 17 is also trained over an adjustable idler sprocket 19 and adjustment of the position of sprocket 19 operates in a conventional manner to adjust the tension on chain 17. The sprocket and chain drive is enclosed by an outer housing or shroud 20. With this drive connection, the shafts 9 rotate in opposite directions, as shown in FIG. 5.

Figure 4:
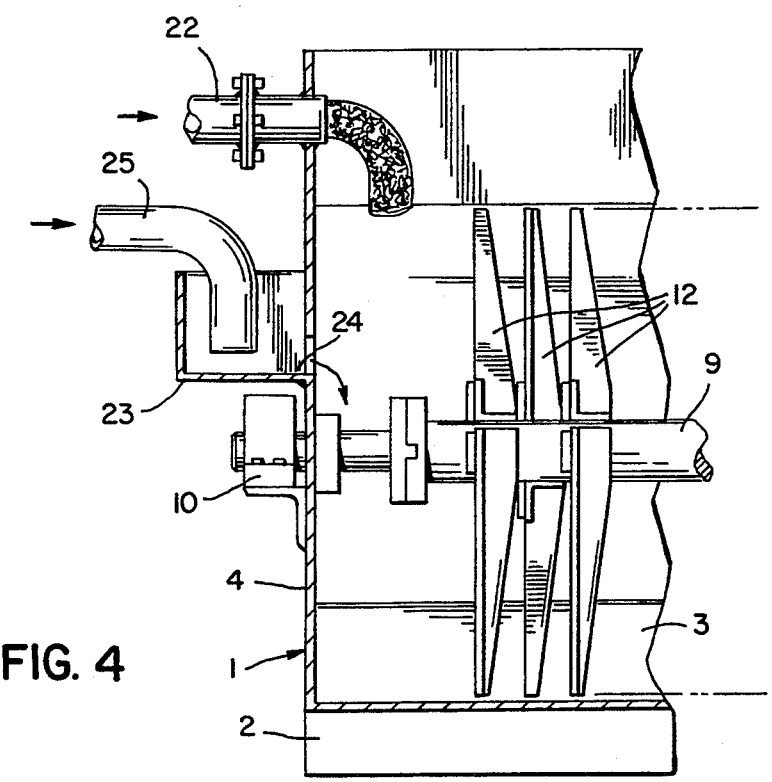
FIG. 4 is a fragmentary vertical section of the upstream end of the reactor.

The leather scrap or waste containing approximately 2% chromium is fed to the upstream mixing zone 7 through an inlet conduit 22. The leather scrap has a moisture content of about 50% by weight and is preferably fed to the reactor vessel 1 by a piston-cylinder arrangement, in which the scrap is continuously fed to the vessel in the form of an elongated plug, as shown in FIG. 4. At a solids content of 50%, the leather scrap has a consistency similar to wet sawdust.

Mounted on the outer surface of wall 4, is an open-sided trough or gutter 23, and end wall 4 is provided with an opening, with the edge of the wall bordering the lower end of the opening being flush with the bottom surface 24 of the trough 24. Thus, the liquid in trough 23 will flow across the surface 24, and enter the mixing zone 7 of the vessel in the form of a curtain.

An alkali metal solution, preferably a solution of potassium hydroxide at a pH of more than 12.0, is fed to the trough 23 through inlet pipe 25. The potassium hydroxide is utilized in an amount of about 3% of the weight of the leather scrap. Potassium hydroxide is preferred over alkaline earth metal oxides or hydroxides, such as calcium oxide, because the potassium hydroxide provides faster reaction times and side precipitates are not formed. Also potassium ions are a benefit in an animal feed or fertilizer.

In addition, fresh water is introduced to the trough through conduit 26. The resulting solution will flow across the bottom surface 24 of the trough into the mixing zone 7 and will be mixed with the chrome leather scrap being fed through inlet pipe 22. The water is preferably added in a weight ratio of about 5:1 to the leather scrap, i.e. for each lb. of scrap (50% solids), 2 lbs. of water are used.

Figure 3:
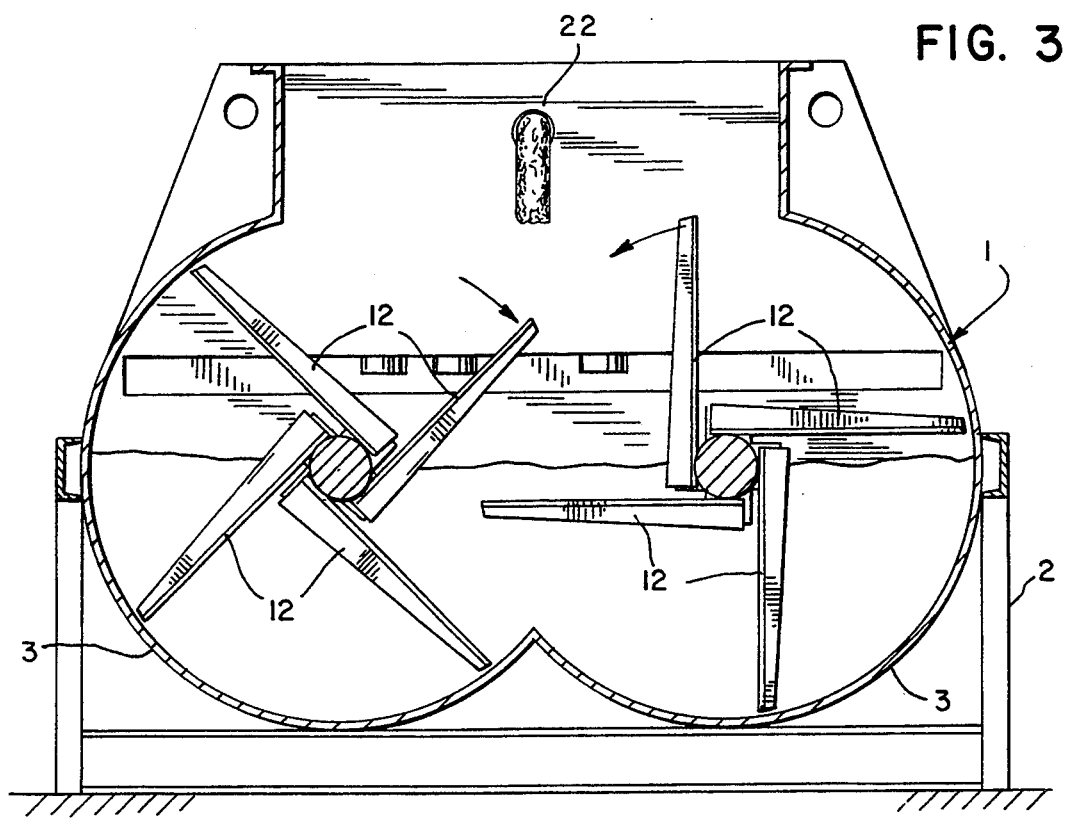
FIG. 3 is a section taken along line 3—3 of FIG. 2.

The hydrolysate is discharged from the hydrolyzing zone 8 through an outlet opening 27 in downstream end wall 5, and the liquid will overflow a weir 28 that defines the lower edge of outlet 27. Weir 28 is positioned such that the liquid level in the reactor vessel 1 will be approximately at the axes of the shafts 9, as shown in FIG. 3.

In operation, the leather scrap or waste, at a consistency of about 50% solids, is fed in the form of a continuous plug through the inlet conduit 22, and simultaneously the potassium hydroxide solution, at a temperature of about 180° F. to 190° F. flows across surface 24 in trough 23 into the mixing zone 7.

The mixing paddles 12 provide a shearing action on the leather scrap or waste to thoroughly mix the leather scrap with the solution. The mixture progresses downstream through the mixing zone in a period of approximately 30 to 45 minutes.

It is contemplated that a small amount of urea, in an amount of about 0.5% to 1.0% by weight of the leather scrap, can also be added to the mixing zone, and the urea acts as a sequestering agent to facilitate the release of the chromium compounds.

The helical flights 13 in the hydrolyzing zone rotate slowly with a tip speed in the range of about 1 to 3 feet per second. With this speed the mixture will have a residence time of about 1 to 1.25 hours in the hydrolyzing zone.

To accelerate the hydrolyzation, heating means such as steam can be introduced into the mixture through a series of steam lines 29, thus maintaining the mixture at a temperature in the range of 200° F. to 225° F. The lower ends of the steam lines 29 are located beneath the liquid level in the reaction vessel. To accommodate the steam lines 29, the rotating helical flights 13 are broken away, as shown in FIG. 2.

During the hydrolyzation, the organics are dissolved in the aqueous solution and the pH drops to 8.5, signifying the completion of the reaction. The resulting protein hydrolysate has a solids content of about 10% to 12% and contains suspended insoluble particles of chromium compounds, i.e. chromium hydroxide. The 8.5 pH is the desired level for the precipitation of the chromium compounds. At a lower or higher pH, trivalent chromium hydroxide is more soluble.

The hydrolysate is discharged from the vessel over the weir 28 into sump 32. With a solids content of about 10% to 12%, the hydrolysate is not commercially marketable, and thus the process contemplates the concentration of the hydrolysate by recirculation and evaporation.

Sump 32 is connected by a conduit 33 to a clarifier 34, where the hydrolysate and the precipitated chromium compounds are gravity separated. The precipitated chromium compounds are preferably washed at least once with water to remove organics to prevent spoilage and achieve odor control. The wash can be used for make-up water.

The underflow from the clarifier 34 passes through conduit 35 to a gravity thickener 36, and then through line 37 to a vacuum filter 38. The resulting filter cake being discharged through line 39 from filter 38 and containing trivalent chromium compounds can be subsequently re-employed in the tanning process.

As seen in FIG. 1, the overflow from the clarifier 34 is discharged through line 40 and a portion of the overflow is conveyed directly to evaporator 41 where the hydrolysate is evaporated to provide a solids content of about 42% solids, at which state the hydrolysate has an extended "shelf life" and can be used commercially as an animal feed supplement, fertilizer, or for other commercial usages.

In addition, a second portion of the overflow from clarifier 34 is recirculated through line 42 to the upstream end of the reactor 1 and is discharged into the trough 23. In addition, the effluent from the vacuum filter 38 is conveyed through line 43 and added to the hydrolysate being returned to the reactor through line 42, as shown in FIG. 1. In practice, for every gallon of hydrolysate discharged from reactor 1 to clarifier 34, about 0.8 gallon is discharged from the clarifier in the overflow in line 40, and 0.2 gallon is discharged in the underflow in line 35. Of the 0.8 gallon overflow, about 0.2 gallon is recirculated through line 42 to the reactor vessel 1, while 0.6 gallon is conducted to evaporator 41. Suitable valving, not shown, is incorporated in lines 35, 40 and 42 to control the flow from the clarifier 34 to the gravity thickener 36, evaporator 41 and reactor 1.

With the continual return of the hydrolysate to the reactor 1 through line 42, the solids content of the overflow from the clarifier will be progressively increased, so that less energy is required in the evaporator 41 to achieve the final 42% solids content which is necessary for commercial usage.

The concentrated hydrolysate being discharged from the evaporator through line 44 includes a mixture of various amino acids and has a solids content of about 42%, a pH of 8.5, and a molecular weight generally in the range of about 1,000 to 10,000. As a feature of the invention, the concentrated hydrolysate in line 44 can be delivered to and fractioned in a electrophotophoresis cell 50 to obtain a higher concentration of a desired amino acid. Most amino acids have both a positive and a negative radical at opposite ends, while other amino acids have positive radicals at the ends and a negative radical at the middle of the chain. At a certain pH, which differs from acid-to-acid, an amino acid is neutral. To increase the concentration of a desired amino acid in the hydrolysate, the pH of the hydrolysate is adjusted to the isoelectric point of that desired amino acid, the isoelectric point being the pH at which that amino acid is neutral and has no charge. The hydrolysate is then passed through an electrophoresis cell having a pair of inert electrodes, so that the desired amino acid, having no electrical charge, will pass straight through the cell, while other amino acids will be attracted to either the positive or negative electrode. With this system, the concentration of the desired amino acid will be substantially increased and a substantial portion of the trivalent chromium ions will be collected in the side streams.

Figure 6:
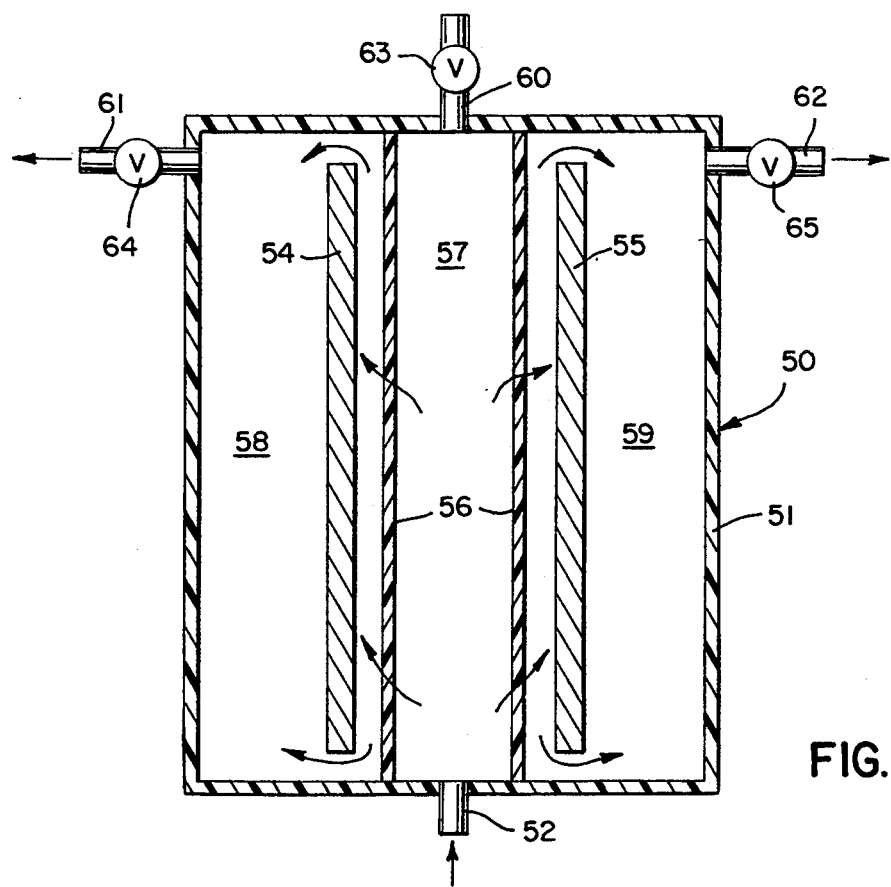
FIG. 6 is a schematic drawing showing an electrophoresis cell.

FIG. 6 shows a typical electrophoresis cell 50 that can be utilized to obtain an increased concentration of a desired amino acid. Cell 50 includes an outer, closed housing or vessel 51 formed of a dielectric material, such as plastic, and an inlet 52 is located in the bottom of the housing and is connected to line 44, so that the concentrated hydrolysate from the evaporator 41 is introduced into the housing 51.

Mounted within the housing is a positive electrode plate 54 and a negative electrode plate 55, and separator layers 56 are positioned inwardly of the electrodes 54 and 55 and divide the housing into a central chamber 57 and a pair of outer chambers 58 and 59. The ends of electrodes 54 and 55 are spaced from the top and bottom of vessel 51, so that flow can occur through the spaces.

Communicating with the upper end of central chamber 57 is an outlet 60, while outlets 61 and 62 communicate with the upper ends of the outer chambers 58 and 59, respectively. Suitable valves 63, 64 and 65 are located in the outlet lines 60–62 to control the flow through the lines.

Certain amino acids may be more valuable from a commercial standpoint than others. For example, proline and hydroxy proline cannot be readily synthesized, and therefore a hydrolysate having a high concentration of these amino acids can have increased commercial value.

To increase the concentration of a desired amino acid, the pH of the hydrolysate, prior to entering the cell 50, is a adjusted to the isoelectric point of the desired amino acid by the addition of an acid material. In the case of proline and hydroxy proline, the pH would be adjusted downwardly to a value of 5.8, which is the isoelectric point of those amino acids. With a pH of this value, proline and hydroxyproline are neutral and will flow directly through the central chamber 57 to the outlet. On the other hand, other amino acids which have very low isoelectric points will be drawn through the separator or membrane 56 to the negative electrode 55 and will be released near that electrode at a predetermined rate and discharged through the outlet 59. Those amino acids with isoelectric points greater than 5.8 will be drawn to the opposite positive electrode 54 and again released at a rate through outlet 58, which corresponds to the feed stock concentration.

High voltage, low amperage power is applied to the electrodes with 10,000 volts and 5 milli amps being suitable.

Through the use of electrophoresis the concentration of the desired amino acid, such as proline or hydroxy proline can be substantially increased. For example, the concentration of hydroxy proline in the hydrolysate being discharged from evaporator 41 through line 46 may be in the range of 12% to 13%, while that the concentration of proline may be in the range of 14% to 15%. Through the electrophoresis the total concentration of hydroxy proline and proline can be increased to a value of about 20% or more.

While the drawings show reactor vessel 1 having an open top, it is contemplated that the reactor vessel can be enclosed and can be operated at a pressure up to about 15 psig. The increased pressure can substantially decrease the reaction time and thus the residence time in the reactor vessel can be reduced from a period of 1.5 to 2.0 hours for atmospheric conditions to a period of about 0.75 to 1.0 hours for a pressurized condition of 2 to 3 atmospheres. An increased pressure also permits higher operating temperatures and some conservation of energy.

With a closed and pressurized system, a stream of air can be fed countercurrently through the upper portion of the reactor vessel 1 to pick up any volatiles which may be released during the hydrolyzing action. The air can then be discharged from the upstream end of the vessel 1 to a suitable scrubber.

The invention provides for the continuous processing of chrome leather scrap or waste to provide a concentrated hydrolysate that can be used as an animal feed supplement, fertilizer, or for the commercial production of other products. In addition, the chromium compounds are recovered from the scrap and can be reused in the tanning process.

As a portion of the hydrolysate is recirculated to the reaction vessel, the overall concentration of solids in the hydrolysate is progressively increased and thus the amount of fresh water required for processing is reduced. As the amount of water is reduced, the energy required for final evaporation of the hydrolysate is correspondingly reduced.

Various modes of carrying out the invention are contemplated as being within the scope of the following claims particularly pointing out and distinctly claiming the subject matter which is regarded as the invention.

I claim:

1. An apparatus for hydrolyzing chrome leather scrap, comprising a vessel having an upstream section and a downstream section, a horizontal shaft disposed in said vessel, drive means operably connected to the shaft for rotating the shaft, first feeding means in the upstream section of the vessel for feeding a mass of chrome leather scrap to said upstream section, second feeding means for introducing an aqueous alkali solution to said upstream section, mixing means mounted on the shaft and located in the upstream section for mixing said scrap and said solution to provide a mixture, conveying means mounted on the shaft and located in the downstream section for conveying the mixture in a downstream direction, and outlet means in the downstream section of the vessel for discharging protein hydrolysate containing suspended insoluble chromium compounds from the vessel, separating means for receiving said protein hydrolysate and said suspended insoluble chromium compounds from the downstream section of the vessel and separating said insoluble chromium compounds from said protein hydrolysate, and recirculating means for recirculating a portion of the protein hydrolysate to the upstream section of the vessel.

2. The apparatus of claim 1, wherein said outlet means comprises a weir in said vessel.

3. The apparatus of claim 1, wherein said first feeding means comprises means for continuously feeding said mass to said upstream section in the form of an elongated plug.

4. The apparatus of claim 1, and including a pair of said shafts disposed in said vessel, said shafts disposed in spaced parallel relation, said mixing means being mounted on both of said shafts and said conveying means being mounted on both of said shafts.

5. The apparatus of claim 1, and including supply means for introducing steam into the downstream section of the vessel.

6. The apparatus of claim 5, wherein said conveying means comprises a helical flight and said flight has at least one gap to receive said supply means as said flight is rotated.

7. The apparatus of claim 5, wherein said supply means comprises a conduit having an outlet end disposed beneath the level of the mixture in said vessel.

8. An apparatus for hydrolyzing chrome leather scrap, comprising a vessel having an upstream section and a downstream section, a horizontal shaft disposed in said vessel, drive means operably connected to the shaft for rotating the shaft, first feeding means in the upstream section of the vessel for feeding a mass of chrome leather scrap to said upstream section, second feeding means for introducing an aqueous alkaline solution to said upstream section to provide a mixture of leather scrap and aqueous alkaline solution, a plurality of mixing members disposed on the shaft and located in said upstream section, a helical flight mounted on the shaft and disposed in said downstream section for conveying the mixture in a downstream direction, heating means disposed in said downstream section for heating the mixture to provide a protein hydrolysate containing suspended insoluble chromium compounds, outlet means in the downstream section of the vessel for discharging said protein hydrolysate containing said suspended insoluble chromium compounds from the vessel, and separating means for separating the protein hydrolysate from said insoluble chromium compounds.

9. The apparatus of claim 8, wherein said heating means comprises means to supply steam to said downstream section.

10. The apparatus of claim 9, wherein said means for supplying steam comprises at least one conduit having a discharge end located beneath the level of the mixture in said vessel, said helical flight having a gap to receive said conduit.

11. The apparatus of claim 8, wherein said alkaline solution comprises a solution of potassium hydroxide.

12. The apparatus of claim 8, and including means for recirculating a portion of the protein hydrolysate to the upstream section of the vessel.

13. The apparatus of claim 8, and including a pair of said shafts disposed in said vessel and located in parallel spaced relation, a plurality of said mixing members disposed on the upstream end of each shaft, the mixing members on one shaft being interdigitated with mixing members on the other shaft.

14. The apparatus of claim 13, wherein each shaft has said helical flight mounted on the downstream end thereof, the helical flight on one shaft being interdigitated with the helical flight of the other shaft.

15. The apparatus of claim 12, and including means for concentrating a second portion of the protein hydrolysate being discharged from said outlet means to provide a concentrated hydrolysate.

16. A method for hydrolyzing chrome leather scrap, comprising the steps of introducing chrome leather scrap into an upstream end of a reactor zone, adding an aqueous alkaline solution having a pH greater than 12.0 to said upstream end, mixing said solution and said leather scrap to provide a mixture, conveying the mixture to a downstream end of said reactor zone, heating the mixture with steam as it is conveyed to the downstream end to provide a protein hydrolysate containing suspended insoluble chromium compounds, and separating the insoluble chromium compounds from said protein hydrolysate.

17. A method for hydrolyzing chrome leather scrap, comprising the steps of introducing chrome leather scrap into an upstream end of a reaction zone, adding an aqueous alkaline solution having a pH greater than 12.0 to said upstream end, mixing said solution and said leather scrap to provide a mixture, engaging the mixture with a helical flight to convey the mixture to a downstream end of said reaction zone, heating the mixture as it is conveyed to the downstream end to provide a protein hydrolysate containing suspended insoluble chromium compounds, and separating the insoluble chromium compounds from said protein hydrolysate.

18. A method for hydrolyzing chrome leather scrap, comprising the steps of introducing chrome leather scrap into an upstream end of a reaction zone, adding an aqueous alkaline solution having a pH greater than 12.0 to said upstream end, mixing said solution and said leather scrap to provide a mixture, conveying the mixture to a downstream end of said reaction zone, heating the mixture as it is conveyed to the downstream end to provide a protein hydrolysate containing suspended insoluble chromium compounds, and separating the protein hydrolysate from said insoluble chromium compounds when the pH of the mixture is decreased to a value of about 8.5.

19. The method of claim 18, and including the step of concentrating the protein hydrolysate to provide a concentrated protein hydrolysate with a solids content of at least 42% by weight.

20. The method of claim 19, and including the step of adjusting the pH of the concentrated hydrolysate to the isoelectric point of a given amino acid, and thereafter subjecting the hydrolysate to electrophoresis to increase the concentration of said given amino acid in said hydrolysate.

21. The method of claim 20, wherein the step of subjecting the hydrolysate to electrophoresis comprises passing the hydrolysate through a passage in a cell defined by a pair of spaced electrodes, applying an electric current to said electrodes to cause amino acids having a pH lower than said isoelectric point to be drawn to a negative electrode and causing amino acids having a pH higher than said isoelectric point to be drawn to the positive electrode, and withdrawing the hydrolysate from the passage with said hydrolysate having an increased concentration of said given amino acid.

22. The method of claim 21, and including the step of locating a permeable member around the passage and inwardly of each electrode, said permeable member characterized by the ability to pass charged amino acids therethrough.

23. A method for hydrolyzing chrome leather scrap, comprising the steps of introducing chrome leather scrap into an upstream end of a reaction zone, adding an aqueous alkaline solution having a pH greater than 12.0 to said upstream end, mixing said solution and said leather scrap to provide a mixture, conveying the mixture to a downstream end of said reaction zone, heating the mixture as it is conveyed to the downstream end to provide a protein hydrolysate containing suspended insoluble chromium compounds, separating the insoluble chromium compounds from said protein hydrolysate, and recirculating a portion of the separated protein hydrolysate to the upstream end of said reaction zone.

* * * * *